United States Patent
Yoshiura et al.

(10) Patent No.: US 9,893,671 B2
(45) Date of Patent: Feb. 13, 2018

(54) ELECTRIC-MOTOR CONTROL DEVICE, SYSTEM AND METHOD

(71) Applicant: Kabushiki Kaisha Yaskawa Denki, Kitakyushu (JP)

(72) Inventors: Yasufumi Yoshiura, Kitakyushu (JP); Yasuhiko Kaku, Kitakyushu (JP)

(73) Assignee: KABUSHIKI KAISHA YASKAWA DENKI, Kitakyushu-shi, Fukuoka (JP)

( * ) Notice: Subject to any disclaimer, the term of this patent is extended or adjusted under 35 U.S.C. 154(b) by 0 days.

(21) Appl. No.: 15/480,384

(22) Filed: Apr. 6, 2017

(65) Prior Publication Data

US 2017/0214356 A1     Jul. 27, 2017

Related U.S. Application Data

(63) Continuation of application No. PCT/JP2014/077270, filed on Oct. 10, 2014.

(51) Int. Cl.
*H02P 1/00* (2006.01)
*H02P 1/04* (2006.01)
*H02P 29/00* (2016.01)

(52) U.S. Cl.
CPC ................ *H02P 29/00* (2013.01)

(58) Field of Classification Search
CPC .......... H02P 23/14; H02P 21/143; H02P 3/00; H02P 27/06; H02P 29/00; H02P 29/40;
(Continued)

(56) References Cited

U.S. PATENT DOCUMENTS 5,598,077 A   1/1997   Matsubara et al.
6,861,816 B2 * 3/2005   Eguchi ................ G05B 19/404
                                                        318/619
(Continued)

FOREIGN PATENT DOCUMENTS

JP   H02-123984 A   5/1990
JP   H06-284763 A   10/1994
(Continued)

OTHER PUBLICATIONS

English translation of the International Search Report for PCT/JP2014/077269.
(Continued)

*Primary Examiner* — Paul Ip
(74) *Attorney, Agent, or Firm* — Hubbs, Enatsky & Inoue PLLC

(57) ABSTRACT

Provided is an electric-motor control device, including: a command value calculation unit configured to calculate a command value directed to an electric motor based on a command value and a given moment-of-inertia value; a difference detection unit configured to detect a difference between the moment-of-inertia value and an estimated moment-of-inertia value; a moment-of-inertia value change unit configured to change at least anyone of the moment-of-inertia value and a correction coefficient for the moment-of-inertia value based on the difference; and a change restriction unit configured to restrict a change in the moment-of-inertia value or the correction coefficient when at least any one of the moment-of-inertia value and the correction coefficient is changed to decrease by the moment-of-inertia value change unit.

17 Claims, 8 Drawing Sheets

(58) Field of Classification Search
CPC .............. H02P 7/00; G05B 19/404; G05B 2219/41154; G05B 11/011; G05B 19/19; G05B 19/416; G05B 2219/41426; G05B 2219/43117
USPC ........................... 318/448, 430, 601, 619
See application file for complete search history.

(56) References Cited

U.S. PATENT DOCUMENTS

| | | | |
|---|---|---|---|
| 8,005,630 B2* | 8/2011 | Andoh | H02P 23/14 702/145 |
| 8,716,972 B2* | 5/2014 | Ohta | H02P 3/00 318/430 |
| 2003/0201746 A1* | 10/2003 | Eguchi | G05B 19/404 318/567 |
| 2007/0210731 A1 | 9/2007 | Yoshiura et al. | |
| 2007/0227806 A1* | 10/2007 | Wei | B62D 5/0472 180/446 |
| 2010/0223024 A1* | 9/2010 | Andoh | H02P 23/14 702/115 |
| 2012/0229069 A1* | 9/2012 | Ohta | H02P 3/00 318/601 |
| 2014/0217951 A1* | 8/2014 | Sugihara | G05B 19/19 318/600 |
| 2017/0040916 A1* | 2/2017 | Yoshiura | H02P 29/00 |
| 2017/0104431 A1* | 4/2017 | Hachiya | H02P 21/143 |

FOREIGN PATENT DOCUMENTS

| | | |
|---|---|---|
| JP | H10-295092 A | 11/1998 |
| JP | 2000-020104 A | 1/2000 |
| JP | 2010-142020 A | 6/2010 |
| JP | 2013-118817 A | 6/2013 |
| WO | 2005/093939 A1 | 10/2005 |

OTHER PUBLICATIONS

English translation of the International Search Report for PCT/JP2014/077270.

* cited by examiner

ELECTRIC-MOTOR CONTROL DEVICE, SYSTEM AND METHOD

INCORPORATION BY REFERENCE

The present disclosure contains subject matter related to that disclosed in International Patent Application under the PCT PCT/JP2014/077270 filed in the Japan Patent Office on Oct. 10, 2014, the entire contents of which are hereby incorporated by reference.

BACKGROUND OF THE INVENTION

Field of the Invention

The present invention relates to an electric-motor control device.

Description of the Related Art

In WO 2005/93939 A1, there is described an electric-motor control device including a phase compensation unit including a disturbance observer and a phase advance filter. In Patent Literature 1, there is described a configuration in which compensation is carried out for 0 to 30 times of a moment-of-inertia ratio, which is a ratio between a value of a moment of inertia used by the electric-motor control device and a true value thereof, to thereby stabilize a control system.

SUMMARY OF THE INVENTION

According to one embodiment of the present invention, there is provided an electric-motor control device, including: a command value calculation unit configured to calculate a command value directed to an electric motor based on a command value and a given moment-of-inertia value; a difference detection unit configured to detect a difference between the given moment-of-inertia value and an estimated moment-of-inertia value; a moment-of-inertia value change unit configured to change at least any one of the given moment-of-inertia value and a correction coefficient for the given moment-of-inertia is value based on the difference; and a change restriction unit for restricting a change in the given moment-of-inertia value or the correction coefficient when at least any one of the given moment-of-inertia value and the correction coefficient is changed to decrease by the moment-of-inertia value change unit.

Further, according to another embodiment of the present invention, there is provided an electric-motor control system, including: any one of the electric-motor control devices described above; and an electric motor to be controlled by the electric-motor control device.

Further, according to still another embodiment of the present invention, there is provided an electric-motor control method, including: calculating a command value directed to an electric motor based on a command value and a given moment-of-inertia value; detecting a difference between the given moment-of-inertia value and an estimated moment-of-inertia value; changing at least any one of the given moment-of-inertia value and a correction coefficient for the given moment-of-inertia value based on the difference; and restricting a change in at least any one the given moment-of-inertia value and the correction coefficient when at least any one of the given moment-of-inertia value and the correction coefficient is changed to decrease.

DESCRIPTION OF THE EMBODIMENTS

From the point of view of the inventors of the present invention, in order to convert a speed command value to a torque command value for an electric motor in electric-motor control, a value of a moment of inertia of the electric motor itself and a load connected to the electric motor need to be acquired. When the value of the moment of inertia greatly differs from a true value thereof, the control system becomes unstable. However, it is generally difficult to accurately acquire the value of the moment or inertia, and the value may fluctuate during drive of the electric motor.

Thus, the inventors of the present invention currently consider estimating a difference of the value of the moment of inertia from the true value thereof and changing the value of the moment of inertia during the control of the electric motor, to thereby stabilize the control system and secure sufficient tracking performance regardless of the value of the true value of the moment of inertia. Then, as a result of extensive research and development, the inventors of the present invention have gained such perspective that desired stability and tracking performance are acquired when the value of the moment of inertia is increased so as to approach the true value. However, the inventors of the present invention have found that when the value of the moment of inertia is conversely decreased, there is such a fear that the estimation of the difference of the value of the moment of inertia from the true value thereof may temporarily become unstable and thus the value of the moment of inertia may not be correctly changed.

Thus, as a result of further extensive research and development of securing the stability and the tracking performance of the control system by changing the value of the moment of inertia during the control of the electric motor, the inventors of the present invention have arrived at a novel and original electric-motor control device and the like. In the following, a detailed description is given of the electric-motor control device and the like by way of embodiments.

Figure 1:
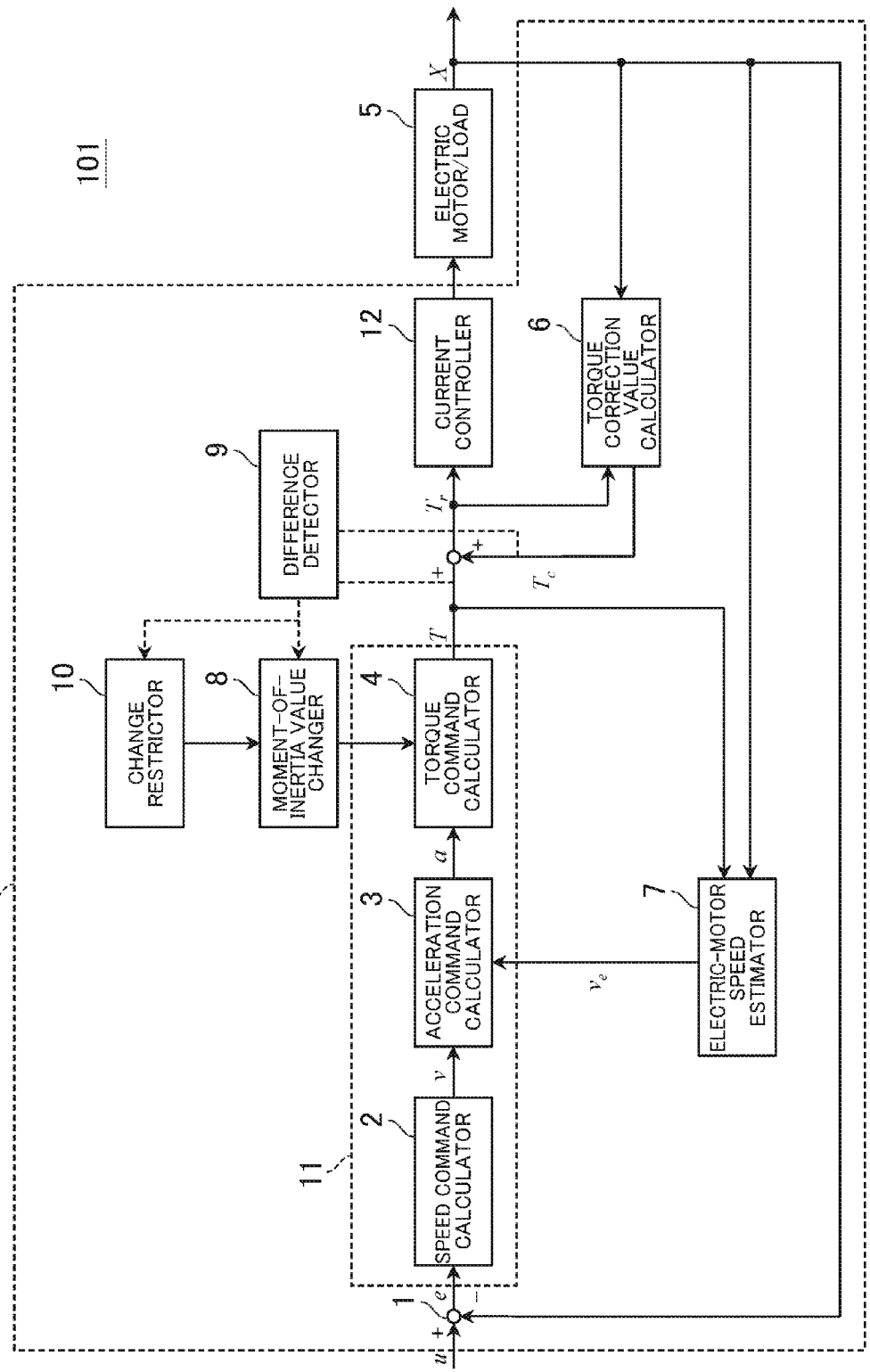
FIG. 1 is a control block diagram for illustrating an entire electric-motor control system including an electric-motor control device according to a first embodiment of the present invention.

FIG. 1 is a control, block diagram for illustrating an entire electric-motor control system 101 including an electric-motor control device 100 according to a first embodiment of the present invention. In this case, the electric-motor control device 100 is a device constructed by integrating an amplifier configured to supply electric power for operating a servomotor and an inverter, and a control circuit configured to control a current and a voltage output from the amplifier and the like. Currently, the control in the electric-motor control device is discrete control (so-called digital control) by a digital processor in many cases, and hence control blocks illustrated in FIG. 1 do not always represent electric circuits that physically exist, and include control blocks whose functions are achieved by software executed on the digital processor.

The electric-motor control device 100 is configured to input a position command u as control input, and output, as control output, a signal for driving an electric motor/load 5, which is a control subject. According to this embodiment, the electric-motor control device 100 is configured to output, as the control output, a current for driving an electric motor included in the electric motor/load 5. In a node 1, a current position X of a load 5, namely, the electric motor and machine components mounted to the electric motor, is subtracted from the position command u, resulting in a deviation e. Subsequently, the deviation e is converted into a speed command v by a speed command calculation unit 2. Further, the speed command v is converted into an acceleration command a by an acceleration command calculation unit 3. Further, the acceleration command a is multiplied by a set moment-of-inertia value $J_0$ so as to be converted into a torque command T in a torque command calculation unit 4. The speed command calculation unit 2, the acceleration command calculation unit 3, and the torque command calculation unit 4 cooperate with one another to form a command value calculation unit 11 configured to calculate a command value directed to the electric motor baaed on the position command u, which is the command value, and the given moment-of-inertia value $J_0$.

In the electric-motor control, as an example, current/voltage control is carried cut by the inverter or the like based on this torque command T, thereby driving the electric motor. According to this embodiment, a corrected torque command $T_r$ is acquired by adding a torque correction value $T_c$ output from a torque correction value calculation unit 6 to the torque command T. The electric-motor control device 100 inputs this corrected torque command $T_r$ into a current control unit 12 including the inverter and the like, and converts the corrected torque command $T_r$ to the current to be input to the electric motor/load 5. In this way, the electric motor included in the electric motor/load 5 is driven and controlled based on the current output from the electric-motor control device 100.

According to this embodiment, it is assumed that the electric-motor control device 100 includes the current control unit 12, but the current control unit 12 may be an independent device and may be separated from the electric-motor control device 100.

The torque correction value calculation unit 6 is a disturbance observer designed as a state observer into which a model (nominal model) receiving disturbance is built. In an example described later, the torque correction value calculation unit 6 includes a current loop model, an inverse system of a nominal model, and a low-pass filter.

Moreover, an electric-motor speed estimation unit 7 functions as a speed observer configured to estimate an electric-motor speed, and simultaneously serves as a phase compensator configured to advance the phase. An acquired estimated electric-motor speed $v_e$ input to the acceleration command calculation unit 3, thereby constructing a speed feedback loop and advancing the phase in this loop, resulting in an improvement in phase margin and stabilized response.

Moreover, in the electric-motor control device 100 according to this embodiment, with the operations of the torque correction value calculation unit 6 and the electric-motor speed estimation unit 7, the control system can be stabilized, and desired performance of tracking the position command u can be provided even when a true value $J_R$ of an actual moment of inertia of the electric motor/load 5 and the moment-of-inertia value $J_0$ used in the torque command calculation unit 4 do not accurately match each other. On this occasion, a range of a true value $J_R/J_0$ of a moment-of-inertia ratio being a ratio of the true value $J_R$ of the moment of inertia to the moment-of-inertia value $J_0$, in which the control system is stable and the desired tracking performance is provided, is from 0 to 30 or less as described above in the "Background Art" section.

In the electric-motor control device 100 according to this embodiment, the electric-motor speed is estimated and the phase is compensated by using the electric-motor speed estimation unit 7 in the speed feedback loop. However, the phase compensation does not always need to be carried out, and the electric-motor speed may be directly acquired by differentiating the current position X being the output of the electric motor/load 5, in place of the estimation of the electric-motor speed. In this case, influence of disturbance including the mismatch between the true value $J_R$ of the moment-of-inertia value and the inertia $J_P$ tends to be exerted, and the phase margin is not provided. Thus, the range of the true value $J_P/J_0$ of the moment-of-inertia ratio in which the control system is stable and the desired tracking performance is provided decreases.

Incidentally, it is difficult to directly measure the true value $J_R$ of the moment of inertia of the electric motor/load 5 during the control of the electric motor by the electric-motor control device 100, and the true value cannot usually be accurately known. Thus, as described in the following, the electric-motor control device 100 is configured to indirectly estimate the true value $J_R$ of the moment of inertia from acquired various types of information, or acquire a value that can be estimated. Thus, in the following, the value of the moment of inertia of the electric motor/load 5 that is estimated or can be estimated by the electric-motor control device 100 is referred to as "estimated value $J_P$ of the moment of inertia". The estimated value $J_P$ of the moment of inertia may temporarily be different from the true value $J_R$ of the moment of inertia due to measurement errors of various types of information and a transient response, but the estimated value $J_P$ of the moment of inertia may be practically used as the true value $J_R$ of the moment of inertia. It is to be understood that when the true value $J_R$ of the moment of inertia is accurately known, the estimated value $J_P$ of the moment of inertia may match the true value $J_R$ of the moment of inertia.

In the electric-motor control device 100, a moment-of-inertia value change unit 8 is further provided. The moment-of-inertia value change unit 8 is configured to change the value of the moment-of-inertia value $J_0$ used in the torque command calculation unit 4 based on a value representing the difference between the moment-of-inertia value $J_O$ and the estimated value $J_P$ of the moment of inertia, thereby stabilizing the control system independently of the true value $J_R$ of the moment of inertia, and acquiring desired tracking performance. According to this embodiment, an estimated moment-of-inertia ratio $J_P/J_O$ is used as the value representing the difference between the moment-of-inertia value $J_O$ and the estimated value $J_P$ of the moment of inertia.

The estimated moment-of-inertia ratio $J_P/J_O$ is detected by a difference detection unit 9 as the difference between the moment-of-inertia value $J_O$ and the estimated value $J_P$ of the moment of inertia. This estimated moment-of-inertia ratio $J_P/J_O$ is approximately equal to a ratio $T_c/T$ of the torque correction value $T_c$ to the torque command value T as described later. Therefore, the ratio $T_c/T$ can be used as an estimated value of the true value of the estimated moment-of-inertia ratio $J_P/J_O$. Thus, according to this embodiment, the difference detection unit 9 uses $T_c/T$ acquired from the torque command value T and the torque correction value $T_c$ to indirectly detect, the estimated moment-of-inertia ratio $J_P/J_O$.

Moreover, a change restriction unit 10 is further provided for the moment-of-inertia value change unit 8. The change restriction unit 10 is configured to restrict the change in the moment-of-inertia value $J_O$ under a specific state, in particular, when the moment-of-inertia value $J_O$ is changed to decrease by the moment-of-inertia value change unit 8.

In this embodiment, the moment-of-inertia value change unit 8 is configured to directly change the moment-of-inertia value $J_O$, but, in place of this direct change, another operation mathematically equivalent to the change in the value of the moment-of-inertia value $J_O$ may be carried out. For example, a certain coefficient (hereinafter referred to as "correction coefficient") to be multiplied by the moment-of-inertia value $J_O$ may be changed. The correction coefficient may be a special coefficient representing a change scale factor for the moment-of-inertia value $J_O$, or may be another known coefficient, for example, a gain constant used in the acceleration command calculation unit 3. Thus, the moment-of-inertia value change unit 8 changes at least any one of the moment-of-inertia value $J_O$ and the correction coefficient. Moreover, when the moment-of-inertia value change unit 8 changes the correction coefficient, it is apparent that the change restriction unit 10 restricts the change in the correction coefficient, and thus the change restriction unit 10 restricts the change in at least any one of the moment-of-inertia value $J_O$ and the correction coefficient.

Figure 2:
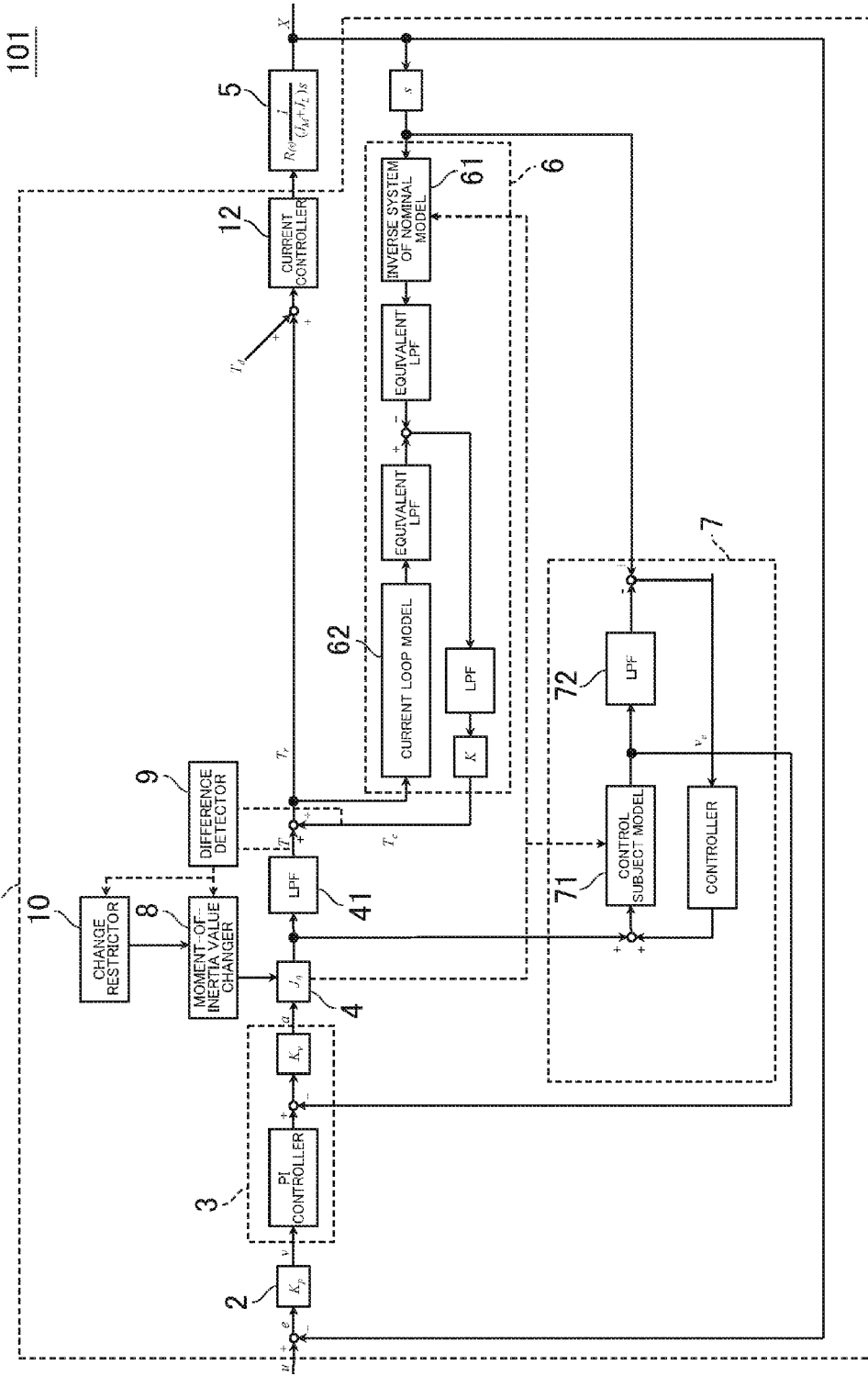
FIG. 2 is a diagram for illustrating, in more detail, control blocks of the entire electric-motor control system including the electric-motor control device according to the first embodiment of the present invention.

FIG. 2 is a diagram for illustrating, in more detail, control blocks of the entire electric-motor control system 101 including the electric-motor control device 100 according to the first embodiment of the present invention. The illustrated control blocks are examples for embodying the control blocks illustrated in FIG. 1, and are not intended to limit the control blocks to the ones illustrated in FIG. 2.

As illustrated in FIG. 2, the torque command calculation unit 4 is configured to multiply the acceleration command a by the moment-of-inertia value $J_O$. Moreover, a low-pass filter 41 is inserted in a subsequent stage of the torque command calculation unit 4.

The electric motor/load 5 includes a control subject including a moment of inertia $J_M$ of the electric motor and a moment of inertia $J_L$ of the load connected to the electric motor. On this occasion, as an example of the control subject, a product of R(s) feeing a mechanical resonance system and $1/(J_M+J_L)s$ being a mechanical rigid body system is exemplified. Moreover, the current control unit 12 including the inverter or the like, which is configured to convert the corrected torque command $T_r$, to a current, is provided in a preceding stage of the electric motor/load 5. Moreover, a disturbance torque $T_d$ is acting on the electric motor/load 5, and is described as a disturbance to the corrected torque command $T_r$. The moment-of-inertia value $J_O$ used in the torque command calculation unit 4 is ideally and preferably the true value $J_R$ of the moment-of-inertia value acquired by combining the moment of inertia $J_M$ of the electric motor and the moment of inertia $J_L$ of the load connected to the electric motor, which are included in the control subject. However, those moments of inertia, particularly the moment of inertia $J_L$ of the load, are difficult to acquire in advance and may vary during the operation. Therefore, in the electric-motor control device 100 according to this embodiment, as an initial value of the moment-of-inertia value $J_O$, the value of the moment of inertia $J_M$ of the electric motor or a value generally close to the value of the moment of inertia $J_M$ of the electric motor is used.

The torque correction value calculation unit 6 is the disturbance observer configured to calculate a difference between an estimated actual torque, which is estimated from the current position X by using an inverse system 61 of a nominal model of the control subject, and a command torque, which is calculated from the corrected torque command $T_c$ through use of a current loop model 62, thereby estimating the disturbance torque. The torque correction value calculation unit 6 then outputs the torque correction value $T_c$ for compensating the disturbance torque. A low-pass filter for stabilizing an operation is appropriately used in the torque correction value calculation unit 6. On this occasion, the torque command T reflects the value of the moment-of-inertia value $J_O$ used in the torque command calculation unit 4, and the torque correction value $T_c$ reflects the estimated value $J_P$ of the moment of inertia. The ratio $T_c/T$ of those values is thus approximately equal to the value of the estimated moment-of-inertia ratio $J_P/J_O$. This value $T_c/T$ is hereinafter referred to as "torque correction ratio", but may be practically treated so as to be equivalent to the estimated moment-of-inertia ratio $J_P/J_O$. The estimated actual torque may be estimated not from the current position X, but from an electric-motor speed $\dot{X}$.

The electric-motor speed estimation unit 7 is constructed as a loop including a control subject model 71 and a low-pass filter 72, and is configured to use the control subject model 71 to estimate the electric-motor speed, and to extract the estimated electric-motor speed $v_e$ from a preceding stage of the low-pass filter 72, thereby applying the speed feedback advanced in phase to the acceleration command calculation unit 3. This configuration improves the phase margin in the speed feedback loop as described above.

When the moment-of-inertia value change unit 8 changes the moment-of-inertia value $J_O$ of the torque command calculation unit 4, and the inverse system 61 of the nominal model of the torque correction value calculation unit 6 and the control subject model 71 of the electric-motor speed estimation unit 7 use the moment-of-inertia value $J_O$, the moment-of-inertia value $J_O$ used in the inverse system 61 of the nominal model and the control subject model 71 is also changed.

Figure 3:
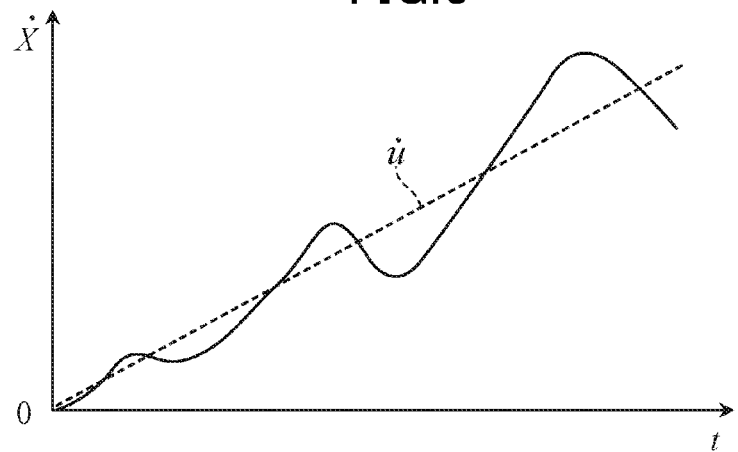
FIG. 3 is a graph for showing an example of an operation when a moment-of-inertia value is not changed by a moment-of-inertia value change unit in the electric-motor control device according to the first embodiment of the present invention when a value of a moment-of-inertia ratio $J_P/J_0$ is 35.
Figure 3:
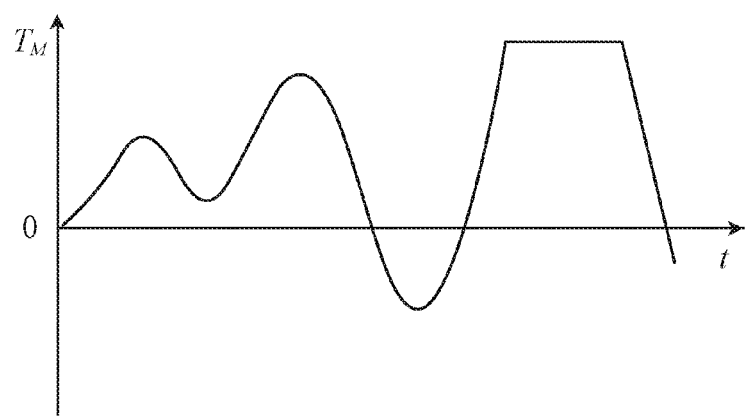
Figure 3:
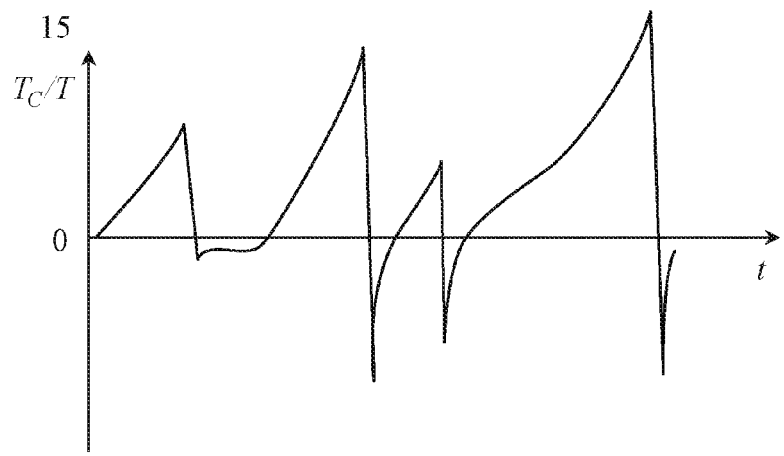

FIG. 3 is a graph for showing an example of an operation when the moment-of-inertia value de is not changed by the moment-of-inertia value change unit 8 in the electric-motor control device 100 according to this embodiment when the true value $J_R/J_O$ of the moment-of-inertia ratio is 35. This graph plots the electric-motor speed $\dot{X}$, an electric-motor torque $T_M$, and the torque correction ratio $T_c/T$ with respect to the time t from a top row in this order.

On the top row of FIG. 3, a speed command u' (time derivative of the position command u) is simultaneously indicated by the broken line, and a command to increase the electric-motor speed $\dot{X}$ at a constant speed is represented as the solid line. On this occasion, when the true value $J_P/J_0$ of the moment-of-inertia ratio is in a compensation range, the electric-motor speed $\dot{X}$ is considered to increase while following the speed command u. However, in this example, the true value $J_R/J_0$ of the moment-of-inertia ratio is more than the compensation range. Thus, the electric-motor speed $\dot{X}$ fluctuates, and the control system loses its stability. It is apparent that the desired tracking performance is not provided under this state.

As shown on a middle row of FIG. 3, the electric-motor torque $T_M$ also fluctuates, and a waveform is truncated due to a torque limit of the electric motor. As shown on a bottom row of FIG. 3, the value of the torque correction ratio $T_c/T$ significantly fluctuates, and the value of the estimated moment-of-inertia ratio $J_P/J_0$ cannot be estimated after the control system has lost its stability.

Figure 4:
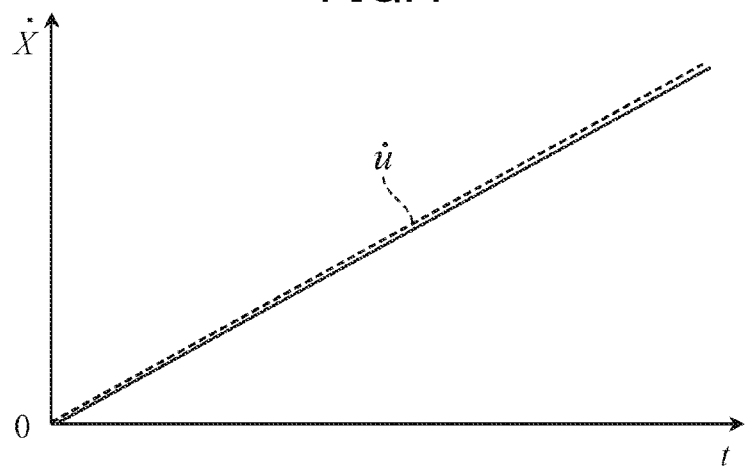
FIG. 4 is a graph for showing an example of an operation when the moment-of-inertia value is changed by the moment-of-inertia value change unit in the first embodiment of the present invention when the value of the moment-of-inertia ratio $J_P/J_0$ is 50.
Figure 4:
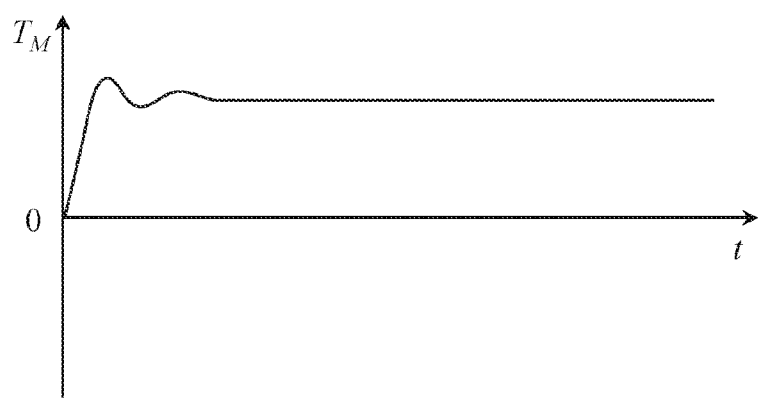
Figure 4:
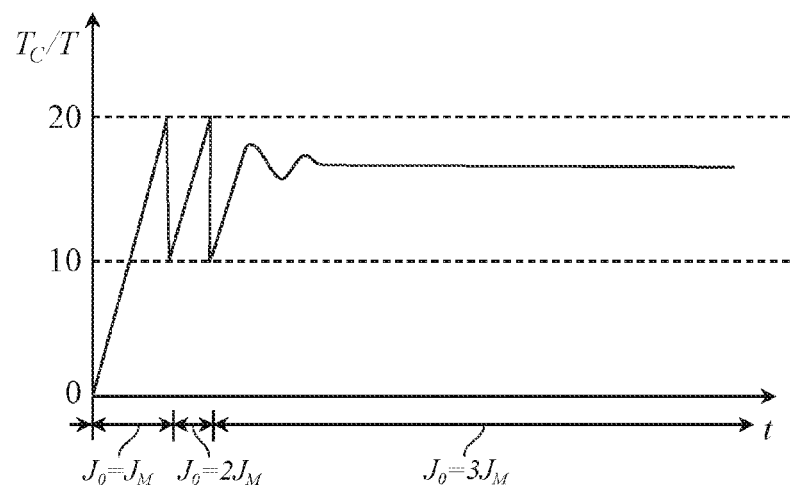

In contrast, FIG. 4 is a graph for showing an example of an operation when the moment-of-inertia value $J_0$ is changed by the moment-of-inertia value change unit 8 in this embodiment when the true value $J_R/J_0$ of the moment-of-inertia ratio is 50. In this case, as shown on a top row of FIG. 4, the electric-motor speed $\dot{X}$ generally tracks the speed command u; and as shown on a middle row of FIG. 4, the electric-motor torque $T_M$ quickly converges to a stable value. Thus, it is appreciated that the control system is stable, and the desired tracking performance is provided. As a result, in the electric-motor control device 100 according to this embodiment, a response that can be considered to be practically constant is acquired independently of the magnitude of the load of the electric motor/load 5.

On this occasion, as shown on a bottom row of FIG. 4, the value of the torque correction ratio $T_c/T$ quickly increases simultaneously with the start of the acceleration of the electric motor. In this case, the moment-of-inertia value change unit 8 of the electric-motor control device 100 monitors the value of the torque correction ratio $T_c/T$ detected by the difference detection unit 9, and stepwise increases the moment-of-inertia value $J_0$ used by the torque command calculation unit 4 when the value of the torque correction ratio $T_c/T$ becomes more than a predetermined value (referred to as "increase-time threshold ratio"). On this occasion, the electric-motor control device 100 can provide the stable control up to approximately 25 to 30 of the torque correction ratio $T_c/T$, namely, the true value $J_R/J_0$ of the estimated moment-of-inertia ratio, and the increase-time threshold ratio is thus set to 20 to allow a margin. Moreover, an initial value of the moment-of-inertia value $J_0$ is the moment of inertia $J_M$ of the electric motor.

As a result of this control, $J_0$ is $J_M$ at the start of the acceleration of the electric motor, but when the torque correction ratio $T_c/T$ becomes more than 20, the moment-of-inertia value change unit 8 adds $J_M$ to $J_0$, and $J_0$ is thus changed to $2J_M$. As a result, $J_0$ increases by two times, and the torque correction ratio $T_c/T$ decreases by a half. When the value of the torque correction ratio $T_c/T$ further increases, and again becomes more than the increase-time threshold ratio 20, $J_M$ is similarly added to the moment-of-inertia value $J_0$ by the moment-of-inertia value change unit 8, and $J_0$ is thus changed to $3J_M$. As a result, the value of the torque correction ratio $T_c/T$ is stabilized in the vicinity of 16.7. This corresponds to the fact that the true value of the moment-of-inertia ratio after the update of $J_0$ becomes $J_R/3J_M = 16.7$. Below the bottom row of FIG. 4, the value of the moment-of-inertia value $J_0$ is also shown. In FIG. 3 and FIG. 4, the scales on the vertical axes in the plots of the electric-motor torque $T_M$ shown on the middle row and the torque correction ratio $T_c/T$ shown on the bottom row are not always the same.

In this way, even when the value of the true value $J_R/J_0$ of the initial moment-of-inertia ratio is out of the compensation range, the control system can be stabilized, and the desired tracking performance can be secured by changing, by the moment-of-inertia value change unit 8, the moment-of-inertia value $J_0$ so that the torque correction ratio $T_c/T$, namely, the value of the estimated moment-of-inertia ratio $J_P/J_0$ falls within the compensation range.

A description has been given of the case in which the moment-of-inertia value $J_0$ is increased by the moment-of-inertia value change unit 8. In contrast, for example, consideration is given to a case in which, for example, the load mounted to the electric motor 5 fluctuates during its drive to cause a decrease in the true value $J_R$ of the moment of inertia. In order to secure the tracking performance in this case, the moment-of-inertia value $J_0$ needs to be appropriately decreased so that the moment-of-inertia value $J_0$ does not become excessive.

The change of appropriately decreasing the moment-of-inertia value $J_0$ is made by a change of stepwise decreasing, by the moment-of-inertia value change unit 8, the value of the moment-of-inertia value $J_0$ when the value of the torque correction ratio $T_c/T$ monitored by the moment-of-inertia value change unit 8 becomes less than a predetermined value (referred to as "decrease-time threshold ratio"). On this occasion, as an example, the decrease-time threshold ratio is set to 10. The increase-time threshold ratio and the decrease-time threshold ratio may be equal to each other in this case, but the increase-time threshold ratio and the decrease-time threshold ratio are preferably values different from each other in order to avoid a degradation in control characteristic due to repetition of the increase and the decrease of the value of the moment-of-inertia value $J_0$ when the value of the torque correction ratio $T_c/T$ comes close to the threshold ratio.

Now, as an example, consideration is given to a case in which as shown in FIG. 4, the load fluctuates at a time A and the true value $J_R/J_0$ of the moment-of-inertia ratio becomes 25 under a state where the value of the true value $J_R/J_0$ of the initial moment-of-inertia ratio is 50, the value of the moment-of-inertia value $J_0$ has been changed to $3J_M$, and the value of the torque correction ratio $T_c/T$ is stabilized in the vicinity of 16.7.

Figure 5:
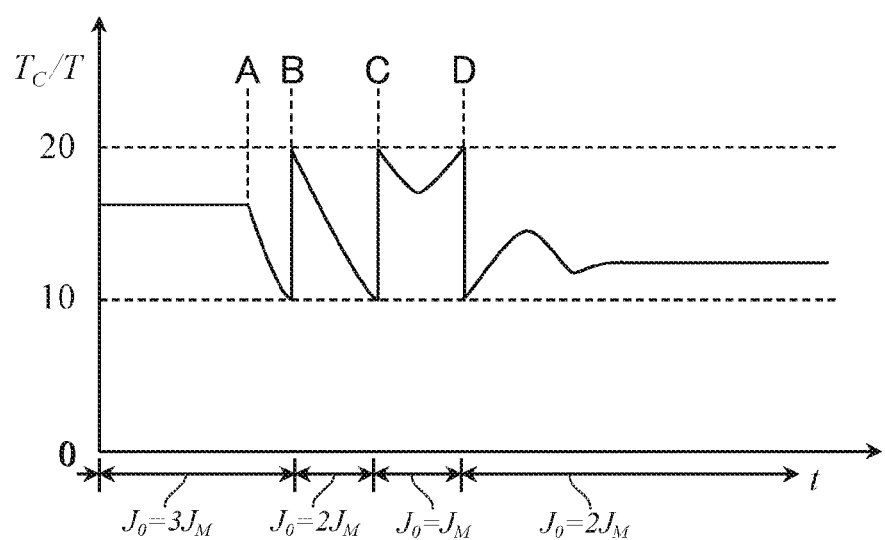
FIG. 5 is a graph for showing an example of an operation when the change in the moment-of-inertia value is not restricted by a change restriction unit in the electric-motor control device according to the first embodiment of the present invention.

FIG. 5 is a graph for showing an example of an operation when the change in the moment-of-inertia value $J_0$ is not restricted by the change restriction unit 10 in the electric-motor control device 100 according to this embodiment.

First, the true value $J_R/J_0$ of the moment-of-inertia ratio fluctuates at the time A, and the value of the torque correction ratio $T_c/T$ consequently starts decreasing from the vicinity of 16.7, which is the current value. Then, when the value of the torque correction ratio $T_c/T$ becomes less than 10, which is the decrease-time threshold ratio, at a time B, the moment-of-inertia value change unit 8 subtracts $J_M$ from $J_0$, thereby changing $J_0$ to $2J_M$. As a result, $J_0$ decreases, and the torque correction ratio $T_c/T$ apparently increases. Then, the torque correction ratio $T_c/T$ continues to decrease further, but the torque correction ratio $T_c/T$ is ultimately expected to be stabilized in a vicinity of 12.5 of the true value $J_R/2J_M$ of the moment-of-inertia ratio. However, when the moment of inertia $J_R$ decreases, the torque correction ratio $T_c/T$ further decreases beyond 12.5, which is the stable value, due to a transient response.

As a result, when the value of the torque correction ratio $T_c/T$ again becomes less than 10, which is the decrease-time threshold ratio, at a time C, the moment-of-inertia value change unit 8 subtracts $J_M$ from $J_0$, thereby changing $J_0$ to $J_M$. Then, the value ox the torque correction ratio $T_c/T$ turns to increase, the value of the torque correction ratio $T_c/T$ becomes more than 20, which is the increase-time threshold ratio, at a time D at this time, and the moment-of-inertia value change unit 8 adds $J_M$ to $J_0$ at this time, thereby changing $J_0$ to $2J_M$. Then, the value of the torque correction ratio $T_c/T$ is finally stabilized in the vicinity of 12.5.

When the restriction is not imposed on the change in the moment-of-inertia value $J_0$ by the change restriction unit 10 in this way, particularly when the true value $J_P$ of the moment of inertia decreases, the moment-of-inertia value $J_0$ is changed, which is not ideally necessary (corresponding to the changes at the times C and D in the example of FIG. 5), and it is suspected that the change adversely affects the control characteristic, for example, generates cogging.

Thus, in the electric-motor control device 100 according to this embodiment, when the moment-of-inertia value $J_0$ is changed to decrease by the change restriction unit 10, a following change in the moment-of-inertia value $J_0$ is restricted, thereby preventing the change in the moment-of-inertia value $J_0$ which is not ideally necessary. The operation of the change restriction unit 10 is, simply put, inhibiting the change in the moment-of-inertia value $J_0$ caused by the transient response when the true value $J_P$ of the moment of inertia decreases.

Figure 6:
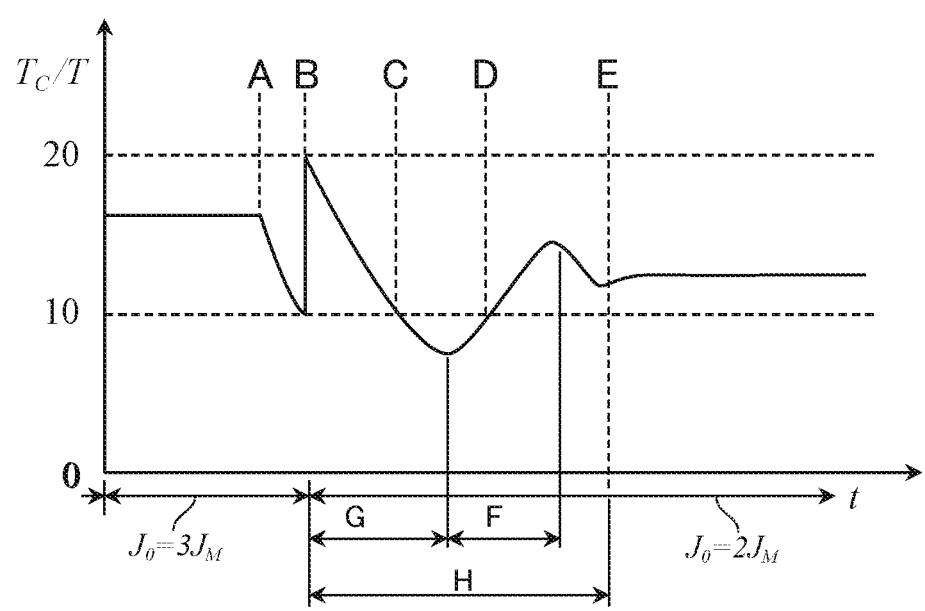
FIG. 6 is a graph for showing an example of an operation when the change in the moment-of-inertia value is restricted by the change restriction unit in the electric-motor control device according to the first embodiment of the present invention.

FIG. 6 is a graph for showing an example of an operation when the change in the moment-of-inertia value $J_0$ is restricted by the change restriction unit 10 in the electric-motor control device 100 according to this embodiment. This example is the same as the example shown in FIG. 5, and it is assumed that the load fluctuates at the time A and the true value $J_R/J_0$ of the moment-of-inertia ratio becomes 25 under a state where the value of the true value $J_R/J_0$ of the initial moment-of-inertia ratio is 50, the value of the moment-of-inertia value $J_0$ has been changed to $3J_M$, and the value of the torque correction ratio $T_c/T$ is stabilized in the vicinity of 16.7.

The true value $J_R/J_0$ of the moment-of-inertia ratio fluctuates at the time A, and the value of the torque correction ratio $T_c/T$ consequently starts decreasing from the vicinity of 16.7, which is the current value. Then, when the value of the torque correction ratio $T_c/T$ becomes less than 10, which is the decrease-time threshold ratio, at the time B, the moment-of-inertia value change unit 8 subtracts $J_M$ from $J_0$, thereby changing $J_0$ to $2J_M$. As a result, $J_0$ decreases, and the torque correction ratio $T_c/T$ apparently increases. Then, the torque correction ratio $T_c/T$ continues to further decrease. The operation up to this point is the same as that of the above-mentioned example.

At the time C, the value of the torque correction ratio $T_c/T$ again becomes less than 10, which is the decrease-time threshold ratio. However, on this occasion, the value of the torque correction ratio $T_c/T$ is in the transient response, and the change restriction unit 10 thus inhibits the change in the value of the moment-of-inertia value $J_0$ by the moment-of-inertia value change unit 8. Therefore, $J_0$ remains at $2J_M$ and is not changed, and the torque correction ratio $T_c/T$ continues to further decrease.

When the torque correction ratio $T_c/T$ turns to increase, the value of the torque correction ratio $T_c/T$ becomes more than 10 at the time D . At a time E, when the value of the torque correction ratio $T_c/T$ comes to be recognized as being stable, the change restriction unit 10 releases the restriction on the change in the value of the moment-of-inertia value $J_0$ by the moment-of-inertia value change unit 8. Subsequently, the change in the moment-of-inertia value $J_0$ by the moment-of-inertia value change unit 8 is enabled, but the value of the torque correction ratio $T_c/T$ is stabilized in the vicinity of 12.5, and thus the value of $J_0$ is maintained at $2J_M$.

In this way, the change in the moment-of-inertia value $J_0$ which is not ideally necessary is prevented by detecting that the value of the torque correction ratio $T_c/T$, namely, the estimated moment-of-inertia ratio $J_P/J_0$ is in the transient response, and restricting, by the change restriction unit 10, the change in the value of the moment-of-inertia value $J_0$ by the moment-of-inertia value change unit 8.

In order to detect the ongoing transient response by the change restriction unit 10, various conditions may be used. As one example, when at least any one of the following conditions is satisfied, the change in the value of the moment-of-inertia value $J_0$ by the moment-of-inertia value change unit 8 may be restricted by the change restriction unit 10. As apparent from the description given above, according to this embodiment, the torque correction ratio $T_c/T$ is used as the estimated moment-of-inertia ratio $J_P/J_0$ in the following conditions.

Condition 1

A case in which the gradient of the fluctuation of the value of the estimated moment-of-inertia ratio $J_P/J_0$ with respect to the time is positive. This case corresponds to a region F shown in FIG. 6. As shown in the region F, in a case in which the gradient of the fluctuation of the value of the estimated moment-of-inertia ratio $J_P/J_0$ with respect to the time is positive, that is, the value of the estimated moment-of-inertia ratio $J_P/J_0$ is increasing, even when the value of the estimated moment-of-inertia ratio $J_P/J_0$ temporarily becomes less than the decrease-time threshold ratio, there is a high possibility that the value subsequently becomes more than the decrease-time threshold ratio. Thus, this case is determined to be the ongoing transient response.

Condition 2

A case in which, after the change of decreasing the moment-of-inertia value $J_0$, the gradient of the fluctuation of the estimated moment-of-inertia ratio $J_P/J_0$ with respect to the time continues to be negative. This case corresponds to a region G shown in FIG. 6, and the change of decreasing the moment-of-inertia value $J_0$ corresponds to the time B of FIG. 6. Then, according to the knowledge of the inventors of the present invention, under the state where the change of decreasing the moment-of-inertia value $J_0$ is made, it is often the case that the value of the estimated moment-of-inertia ratio $J_P/J_0$ temporarily decreases greatly. In other words, the decrease in the value of the estimated moment-of-inertia ration $J_P/J_0$ continuing after this change of decreasing the moment-of-inertia value $J_0$ tends to become less than the stable value thereof and then turns to increase. Thus, even when the value of the estimated moment-of-inertia ratio $J_P/J_0$ temporarily becomes less than the decrease-time threshold ratio in this case, there is a high possibly that the value subsequently becomes more than the decrease-time threshold ratio. Thus, this case is also determined to be the ongoing transient response.

Condition 3

A case in which a predetermined period has not elapsed after the change of decreasing the moment-of-inertia value $J_O$. This case corresponds to a region H shown in FIG. 6. This condition indicates that the transient response is considered to be ongoing for the predetermined period after the change of decreasing the moment-of-inertia value $J_O$. The predetermined period in this case may be defined in advance, or a user may be allowed to arbitrarily define the predetermined period. Alternatively, the electric-motor control device 100 may be configured to automatically define the predetermined period based on the disturbance observer, specifically, a time constant held by the torque correction value calculation unit 6. As the time constant held by the torque correction value calculation unit 6, in the case of the control system illustrated in FIG. 2, a time constant of a low-pass filter illustrated as "equivalent LPF" or a low-pass filter illustrated as "LPF" can be used. When a plurality of time constants exist, the maximum thereof is preferably used. The reason for this is that as long as the value of the estimated moment-of-inertia ratio $J_P/J_O$ is acquired by using the output (torque correction value $T_c$ in this embodiment) from the torque correction value calculation unit 6, a response speed of the moment-of-inertia value change unit 8 does not need to be more than a response speed of the torque correction value calculation unit 6.

Condition 4

A case in which the moment-of-inertia value $J_O$ indicates that this value is less than the moment-of-inertia value $J_M$ of a single electric motor. Basically, a sum of respective moment-of-inertia values of the electric motor and the load is the true value $J_P$ of the moment of inertia in the electric motor/load 5, and thus the moment-of-inertia value $J_O$, which is a rough estimate of the true value $J_R$, does not become less than the moment-of-inertia value $J_M$ of the single electric motor. Thus, this case can be determined to be the ongoing transient response. According to this embodiment, this condition can be defined as a case in which the value of the estimated moment-of-inertia, ratio $J_P/J_O$ is less than 1.

As described above, any of the respective conditions listed above is a condition relating to the determination of whether or not the value of the estimated moment-of-inertia ratio $J_P/J_O$ is in the transient response. In particular, the conditions 1 to 3 can be considered as conditions relating to stability of the value of the estimated moment-of-inertia ratio $J_P/J_O$. Moreover, the conditions 1 and 2 are considered as conditions for making the determination for the stability based on the gradient of the fluctuation of the value of the estimated moment-of-inertia ratio $J_P/J_O$ with respect to the time.

Figure 7:
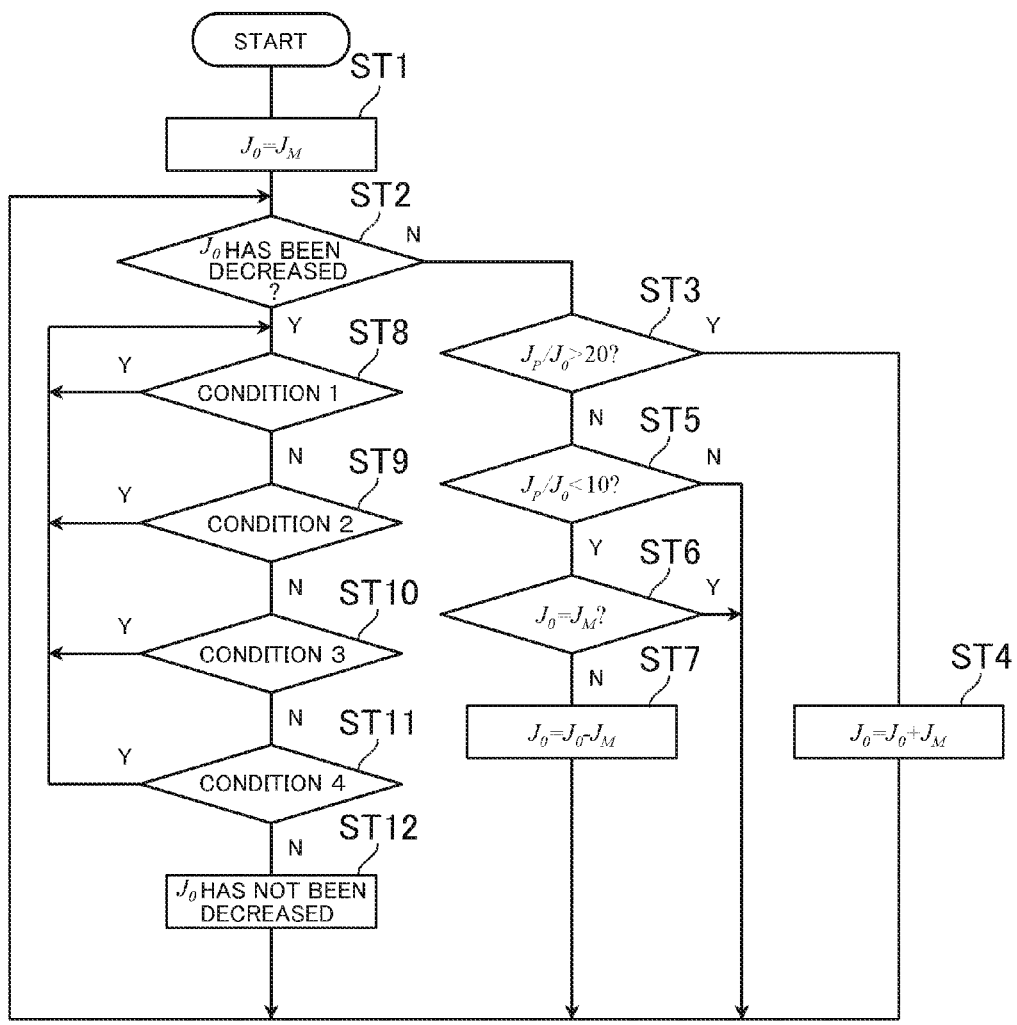
FIG. 7 is a flowchart for illustrating an operation of the moment-of-inertia value change unit and the change restriction unit.

FIG. 7 is a flowchart for illustrating operations of the moment-of-inertia value change unit 8 and the change restriction unit 10 described above. When the electric-motor control device 100 starts the operation, in Step ST1, the moment-of-inertia value change unit 8 first sets the predetermined initial value, on this occasion, the moment of inertia $J_M$ of the electric motor, to the moment-of-inertia value $J_O$ used in the torque command calculation unit 4.

Then, in Step ST2, it is determined whether or not the change of decreasing the moment-of-inertia value $J_O$ has been made. In the initial state, this change has not been made, and the moment-of-inertia value change unit 8 thus proceeds to Step ST3.

In Step ST3, the moment-of-inertia value change unit 8 determines whether or not the value of the estimated moment-of-inertia ratio $J_P/J_O$ is more than 20 being the increase-time threshold ratio. When the value of the estimated moment-of-inertia ratio $J_P/J_O$ is more than 20 being the increase-time threshold ratio, the moment-of-inertia value change unit 8 proceeds to Step ST4, and adds the predetermined value, which is the moment of inertia $J_M$ of the electric motor on this occasion, to the moment-of-inertia value $J_O$, thereby stepwise increasing the moment-of-inertia value $J_O$.

In Step ST3, when the value of the estimated moment-of-inertia ratio $J_P/J_O$ is not more than the increase-time threshold ratio, the moment-of-inertia value change unit 8 proceeds to Step ST5, and determines whether or not the value of the estimated moment-of-inertia ratio $J_P/J_O$ is less than 10 being the decrease-time threshold ratio. When the value of the estimated moment-of-inertia ratio $J_P/J_O$ is less than the decrease-time threshold ratio, the moment-of-inertia value change unit 8 further proceeds to Step ST6, and determines whether or not the moment-of-inertia value $J_O$ has already been equal to the moment of inertia $J_M$ of the electric motor, which is the predetermined initial value. When the moment-of-inertia value $J_O$ is not the initial value, that is, a certain value has been added to the moment-of-inertia value $J_O$, the moment-of-inertia value change unit 8 proceeds to Step ST7, and subtracts the predetermined value, on this occasion, the moment of inertia $J_M$ of the electric motor, from the moment-of-inertia value $J_O$, thereby stepwise decreasing the moment-of-inertia value $J_O$.

In any of the case where the processing in Step ST4 is finished, the case where the processing in Step ST7 is finished, the case where the value of the estimated moment-of-inertia ratio $J_P/J_O$ is determined not to be less than the decrease-time threshold ratio in Step ST5, and the case where the moment-of-inertia value $J_O$ is determined to have already reached the predetermined initial value in Step ST6, the processing returns to Step ST2. The moment-of-inertia value change unit 8 repeats the processing from Step ST2 to Step ST6 at a control cycle, thereby monitoring the value of the estimated moment-of-inertia ratio $J_P/J_O$ and changing the value of the moment-of-inertia value $J_O$ based on the monitored value.

On this occasion, the processing in Step ST7 is only the change of decreasing the moment-of-inertia value $J_O$, and thus, when this processing is carried out, in Step ST2, it is determined that the change of decreasing the moment-of-inertia value $J_O$ has been made. In this case, the processing proceeds to Step ST3.

In Step ST8, the change restriction unit 10 determines whether or not the current case corresponds to the condition 1, namely, the case in which the gradient of the fluctuation of the value of the estimated moment-of-inertia ratio $J_P/J_O$ with respect to the time is positive. When the case corresponds to the condition 1, the processing returns to Step ST8, and repeats this condition determination. When the case does not correspond to the condition 1, the processing proceeds to Step ST9.

In Step ST9, the change restriction unit 10 further determines whether or not the current case corresponds to the condition 2, namely, the case in which, after the change of decreasing the moment-of-inertia value $J_O$, the gradient of the fluctuation of the estimated moment-of-inertia ratio $J_P/J_O$ with respect to the time continues to be negative. When the case corresponds to the condition 2, the processing also proceeds to Step ST8. When the case does not correspond to the condition 2, the processing proceeds to Step ST10.

In Step ST10, the change restriction unit 10 further determines whether or not the current case corresponds to the condition 3, namely, the case in which the predetermined period has not elapsed after the change of decreasing the moment-of-inertia value $J_0$. When the case corresponds to the condition 3, the processing also proceeds to Step ST8. When the case does not correspond to the condition 3, the processing proceeds to Step ST11.

In Step ST11, the change restriction unit 10 further determines whether or not the current case corresponds to the condition 4, namely, the case in which the moment-of-inertia value $J_0$ indicates that the value is less than the moment-of-inertia value $J_M$ of the single electric-motor. When the case corresponds to the condition 4, the processing also proceeds to Step ST8. When the case does not correspond to the condition 4, the processing proceeds to Step ST12.

As described above, in the example of the flow, Steps ST8 to ST11 are repeated, and the other steps are not carried out until the case no longer corresponds to any of the conditions 1 to 4. As a result, the processing of changing the value of the moment-of-inertia value $J_0$ described in Step ST4 and ST7 is no longer carried out, and thus the change restriction unit 10 restricts the change in the value of the moment-of-inertia value $J_0$ by the moment-of-inertia value change unit 8.

In Step ST12, it is considered that the value of the moment-of-inertia value $J_0$ has not been changed. As a result, in Step ST2, the determination that the change of decreasing the moment-of-inertia value $J_0$ has been carried out is no longer made, and the change in the value of the moment-of-inertia value $J_0$ by the moment-of-inertia value change unit 8 becomes possible again. After ST12, the processing returns to Step ST2.

In the description given above, the difference detection unit 5 is designed to detect the difference between the moment-of-inertia value $J_0$ and the estimated moment-of-inertia value $J_P$ from the torque command T and the torque correction command $T_c$, but the detection of this difference is not limited to this configuration.

Figure 8:
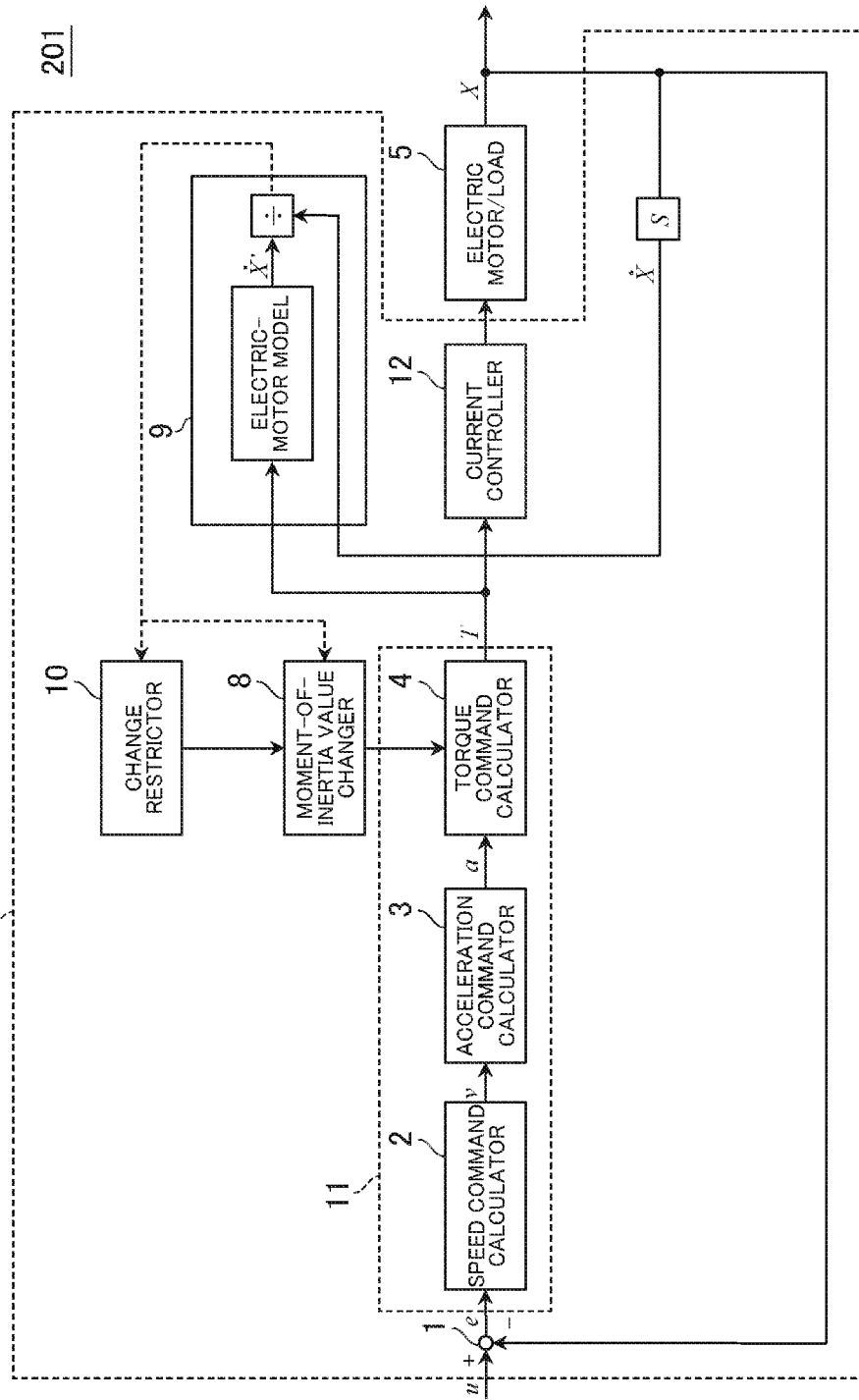
FIG. 8 is a control block diagram for illustrating an entire electric-motor control system including an electric-motor control device according to a second embodiment of the present invention.

FIG. 8 is a control block diagram for illustrating an entire electric-motor control system 201 including an electric-motor control device 200 according to a second embodiment of the present invention. In the electric-motor control device 200 according to this embodiment, the torque correction value calculation unit 6 and the electric-motor speed estimation unit 7 are not provided, and it is apparent that the difference detection unit 9 cannot use the torque correction command $T_c$.

Thus, in the electric-motor control device 200 according to this embodiment, an electric-motor model, which is a mathematical model of the electric motor, is prepared in the difference detection unit 9. The electric-motor model is configured to calculate an estimated speed X' of the electric motor based on the torque command T from the torque command calculation unit. Simultaneously, the actual electric-motor speed Ẋ detected from the electric motor/load 5 is input to the difference detection unit 9. A ratio Ẋ/Ẋ', which is a ratio of the estimated speed Ẋ to the electric-motor speed Ẋ', can be used as an equivalent to the estimated moment-of-inertia ratio $J_P/J_0$ as the torque correction ratio $T_c/T$ according to the embodiment described above. Thus, the difference detection unit 9 detects this ratio Ẋ/Ẋ', and uses this ratio Ẋ/Ẋ' as the estimated moment-of-inertia ratio $J_P/J_0$ representing the difference between the moment-of-inertia value $J_0$ and the estimated moment-of-inertia $J_P$.

The electric-motor control device 200 according to this embodiment is the same as the electric-motor control device 100 according to the embodiment described above in such a point that this estimated moment-of-inertia ratio $J_P/J_0$ (the ratio Ẋ/Ẋ' in this case) is input to the moment-of-inertia change unit 8 and the change restriction unit 10, and other points. Therefore, common components are denoted by the same reference numerals, and a redundant description thereof is omitted.

Also in this configuration, as in the above-mentioned electric-motor control device 100, the change in the moment-of-inertia value $J_0$, which is not ideally necessary, is prevented, the control system is stabilized, and the desired tracking performance is acquired by stepwise changing, by the moment-of-inertia value change unit 8, the moment-of-inertia value $J_0$ used in the torque command calculation unit 4, and restricting, by the change restriction unit 10, the change in the value of the moment-of-inertia value $J_0$ by the moment-of-inertia value change unit 8.

The above-mentioned embodiments are described as specific examples, and are not intended to limit the invention disclosed herein to the configurations of those specific examples. Various modifications may be made by a person skilled in the art to the disclosed embodiments. For example, the shape, the number, the arrangement, or the like of the physical configurations may be changed. Moreover, the control described in the embodiments is not limited to the control embodied as the disclosed flowchart as long as the control employs an algorithm having an equivalent function. It is to be understood that the technical scope of the invention disclosed herein cover all such modifications.

In other words, it should be understood by those skilled in the art that various modifications, combinations, sub-combinations and alterations may occur depending on design requirements and other factors insofar as they are within the scope of the appended claims or the equivalents thereof.

The invention claimed is:

1. An electric-motor control device, comprising:
   a command value calculation unit configured to calculate a command value directed to an electric motor based on a command value and a given moment-of-inertia value;
   a difference detection unit configured to detect a difference between the given moment-of-inertia value and an estimated moment-of-inertia value;
   a moment-of-inertia value change unit configured to change at least any one of the given moment-of-inertia value and a correction coefficient for the given moment-of-inertia value based on the difference; and
   a change restriction unit configured to restrict a change in the given moment-of-inertia value or the correction coefficient when at least any one of the given moment-of-inertia value and the correction coefficient is decreased by the moment-of-inertia value change unit.

2. The electric-motor control device according to claim 1, wherein the change restriction unit is configured to restrict the change in at least any one of the given moment-of-inertia value and the correction coefficient based on a condition relating to stability of a value of the detected difference after at least any one of the given moment-of-inertia value and the correction coefficient is decreased by the moment-of-inertia value change unit.

3. The electric-motor control device according to claim 2, wherein:
   the difference comprises a ratio of the estimated moment-of-inertia value to the given moment-of-inertia value; and
   the condition includes a condition relating to a gradient of a fluctuation of the difference with respect to time.

4. The electric-motor control device according to claim 3, wherein the condition includes a case in which the gradient is positive.

5. The electric-motor control device according to claim 3, if wherein the condition includes a case in which the gradient continues to be negative after at least any one of the given moment-of-inertia value and the correction coefficient Is decreased.

6. The electric-motor control device according to claim 4, wherein the condition includes a case in which the gradient continues to be negative after at least any one of the given moment-of-inertia value and the correction coefficient is decreased.

7. The electric-motor control device ac cording to claim 3, wherein the condition includes a case in which a predetermined period has not elapsed after at least any one of the given moment-inertia value and the correction coefficient is decreased.

8. The electric-motor control device according to claim 4, wherein the condition includes a case in which a predetermined period has not elapsed after at least any one of the given moment-of-inertia value and the correction coefficient is decreased.

9. The electric-motor control device according to claim 5, wherein the condition includes a case in which a predetermined period has not elapsed after at least any one of the given moment-of-inertia value and the correction coefficient is decreased.

10. The electric-motor control device according to claim 6, wherein the condition includes a case in which a predetermined period has not elapsed after at least any one of the given moment-of-inertia value and the correction coefficient is decreased.

11. The electric-motor control device according to claim 7, further comprising a disturbance observer,
wherein the predetermined period is defined based on a time constant in the disturbance observer.

12. The electric-motor control device according to claim 8, further comprising a disturbance observer,
wherein the predetermined period is defined based on a time constant in the disturbance observer.

13. The electric-motor control device according to claim 9, further comprising a disturbance observer,
wherein the predetermined period is defined based on a time constant in the disturbance observer.

14. The electric-motor control device according to claim 10, further comprising a disturbance observer,
wherein the predetermined period is defined based on a time constant in the disturbance observer.

15. The electric-motor control device according to claim 2, wherein the condition includes a case in which the difference represents that at least any one of the given moment-of-inertia value and a product of the given moment-of-inertia value and the correction coefficient, is less than a moment-of-inertia value of a single electric motor.

16. An electric-motor control system, comprising:
the electric-motor control device of claim 1; and
an electric motor to be controlled by the electric-motor control device.

17. An electric-motor control method, comprising;
calculating a command value directed to an electric motor based on a command value and a given moment-of-inertia value;
detecting a difference between the given moment-of-inertia value and an estimated moment-of-inertia value;
changing at least any one of the given moment-of-inertia value and a correction coefficient for the given moment-of-inertia value based on the difference; and
restricting a change in at least any one the given moment-of-inertia value and the correction coefficient when at least any one of the given moment-of-inertia value and the correction coefficient is decreased.

* * * * *